United States Patent
Jia et al.

(10) Patent No.: US 10,458,862 B2
(45) Date of Patent: Oct. 29, 2019

(54) FIBER GRATING SENSOR INSERT, IMPLANTING SYSTEM AND METHOD OF INTELLIGENT PLASTIC PIPE

(71) Applicants: SHANDONG UNIVERSITY, Jinan, Shandong (CN); CHANGCHUN INSTITUTE OF APPLIED CHEMISTRY, CHINESE ACADEMY OF SCIENCES, Changchun, Jilin (CN); JILIN CORE LOGISTICS AND COATING EQUIPMENT CO., LTD., Changchun, Jilin (CN); SHANDONG GELNNT ENVIRONMENTAL TECHNOLOGY CO., LTD., Dezhou, Shandong (CN)

(72) Inventors: Yuxi Jia, Jinan (CN); Linlin Gao, Jinan (CN); Lijia An, Changchun (CN); Weiguo Yao, Changchun (CN); Guoshun Wan, Jinan (CN); Hui Ye, Jinan (CN); Leida Zhang, Jinan (CN)

(73) Assignees: SHANDONG UNIVERSITY, Jinan (CN); CHANGCHUN INSTITUTE OF APPLIED CHEMISTRY, CHINESE ACADEMY OF SCIENCES, Changchun (CN); JILIN CORE LOGISTICS AND COATING EQUIPMENT CO., LTD., Changchun (CN); SHANDONG GELNNT ENVIRONMENTAL TECHNOLOGY CO., LTD., Dezhou (CN)

( * ) Notice: Subject to any disclaimer, the term of this patent is extended or adjusted under 35 U.S.C. 154(b) by 0 days.

(21) Appl. No.: 16/066,215

(22) PCT Filed: Sep. 28, 2017

(86) PCT No.: PCT/CN2017/103874
§ 371 (c)(1),
(2) Date: Jun. 26, 2018

(87) PCT Pub. No.: WO2019/010830
PCT Pub. Date: Jan. 17, 2019

(65) Prior Publication Data
US 2019/0212213 A1    Jul. 11, 2019

(30) Foreign Application Priority Data
Jul. 14, 2017    (CN) .................... 2017 1 05751782

(51) Int. Cl.
*G02B 6/00*    (2006.01)
*G01K 11/32*    (2006.01)
*G01L 1/24*    (2006.01)

(52) U.S. Cl.
CPC .......... *G01K 11/3206* (2013.01); *G01L 1/246* (2013.01)

(58) Field of Classification Search
CPC ............................. G01K 11/3206; G01L 1/24
See application file for complete search history.

(56) References Cited

U.S. PATENT DOCUMENTS

| 4,439,387 | A | * | 3/1984 | Hawley | .................. | B29C 70/20 264/108 |
| 5,110,275 | A | * | 5/1992 | Scheuring | ............. | B29C 48/022 425/113 |

(Continued)

FOREIGN PATENT DOCUMENTS

| CN | 2748888 Y | 12/2005 |
| CN | 1758017 A | 4/2006 |

(Continued)

OTHER PUBLICATIONS

Apr. 19, 2018 International Search Report issued in International Patent Application No. PCT/CN2017/103874.
Apr. 19, 2018 Written Opinion issued in International Patent Application No. PCT/CN2017/103874.

*Primary Examiner* — Ellen E Kim
(74) *Attorney, Agent, or Firm* — Oliff PLC

(57) ABSTRACT

A fiber grating sensor insert, implanting system and method of an intelligent plastic pipe. A fiber grating sensors' strip-shaped insert is accurately implanted in an oblique guiding manner in the pipe's outer surface during the continuous (Continued)

extrusion molding process of the plastic pipe, so that temperature and strain sensors implanted beforehand in strip-shaped insert are buried in the pipe, and the sensors' survival in a bad pipe manufacturing and working environment is ensured, real-time online monitoring on parameters of the pipe such as temperature, strain, pressure and the like is achieved, the conventional continuous extrusion process technology of plastic pipes is combined with optical fiber communication technology, and the manufactured intelligent plastic pipe can achieve real-time online monitoring of temperature, strain, pressure and other parameters, and then can realize the safety early warning, fault diagnosis and automatic control of urban pipe networks, thereby effectively promoting the construction of "smart cities".

8 Claims, 1 Drawing Sheet

(56) References Cited

U.S. PATENT DOCUMENTS

| | | | |
|---|---|---|---|
| 6,444,153 B1* | 9/2002 | Shah | B29C 45/1816 |
| | | | 264/211.21 |
| 7,390,118 B2* | 6/2008 | MacDonald | B29C 45/581 |
| | | | 366/80 |
| 9,366,809 B1* | 6/2016 | Bock | G02B 6/02176 |
| 9,448,380 B2* | 9/2016 | Mogensen | G02B 6/4459 |

FOREIGN PATENT DOCUMENTS

| | | |
|---|---|---|
| CN | 1779067 A | 5/2006 |
| CN | 101738214 A | 6/2010 |
| CN | 104198083 A | 12/2014 |

\* cited by examiner

US 10,458,862 B2

FIBER GRATING SENSOR INSERT, IMPLANTING SYSTEM AND METHOD OF INTELLIGENT PLASTIC PIPE

FIELD OF THE INVENTION

The present invention relates to a fiber grating sensor insert, implanting system and method of an intelligent plastic pipe.

BACKGROUND OF THE INVENTION

With the acceleration of urbanization in China, the development of urban underground pipelines is extremely rapid, and pipelines have become an important part of urban infrastructure and are the "blood vessels" and "nerves" of cities. With the increasing demand for underground pipelines, cities in China are also facing a variety of underground pipe network challenges: urban waterlogging, road ground subsidence, burning and explosion, drinking water pollution and the like. Therefore, the intelligent construction of urban pipelines cannot be delayed.

Sensors are one of the key technological means to realize the intelligentization of equipment and facilities. The fiber grating is a sensing element that is very sensitive to the external environment such as strain, temperature and the like, and distributed multi-point measurement of a single fiber can be achieved through a fiber grating string. In addition, fiber grating sensors have the advantages of light weight, small volumes, high sensitivity, corrosion resistance, anti-electromagnetic interference and the like, and thus are widely used in health monitoring and intelligent control of aerospace and large civil engineering structures.

To realize real-time monitoring and intelligent data analysis of key parameters such as temperature, strain, and pressure in urban underground pipelines, it is necessary to integrate the unique advantages of underground pipe network systems and fiber grating sensing systems to form an intelligent pipeline safety monitoring system to realize safety early warning, fault diagnosis and automatic control of the urban pipe networks.

At present, the fiber grating sensors are mainly surface-mounted and implanted for use. If such a fiber grating sensor is attached to the inner surface of the pipe, the erosion corrosion of the fluid in the pipe is liable to cause debond, shift and even breakage of the sensor; if the fiber grating sensor is attached to the outer surface of the pipe, the sensor is prone to breakage and inactivation due to the bad construction or working environment at the outside of the pipe, thus seriously affecting the test accuracy and service life of the sensor. Therefore, the fiber grating sensor needs to be implanted in the pipe to ensure its survival rate and test accuracy. However, it is very difficult to implant the fiber grating sensor in an industrial continuous extrusion process of the pipe, and implantation of the fiber grating sensor in the continuously extruded pipe is still a technical bottleneck of an intelligent plastic pipe.

SUMMARY OF THE INVENTION

In order to solve the above problems, the present invention provides a fiber grating sensor insert, implanting system and method of an intelligent plastic pipe. The present invention can ensure the survival rate of sensors in a bad pipe manufacturing and working environment, and achieve real-time online monitoring on parameters of the pipe such as temperature, strain, pressure and the like.

A first objective of the present invention is to provide a fiber grating sensor insert of an intelligent plastic pipe. The insert adopts a strip-shaped structure, and the cooperation of reinforcing fibers and matrix resin ensures that the fiber grating sensor insert is not fused or pulled apart while being implanted in the plastic pipe, thus laying a solid foundation for forming the intelligent plastic pipe.

A second objective of the present invention is to provide a fiber grating sensor implanting system for an intelligent plastic pipe. Using the system, a strip-shaped insert of fiber grating sensors is implanted in an oblique guiding manner in the outer surface of the pipe during the continuous extrusion molding process of the plastic pipe, so that temperature and strain sensors implanted beforehand in the strip-shaped insert are buried in the pipe.

A third objective of the present invention is to provide a fiber grating sensor implanting method of an intelligent plastic pipe. The method specifically includes preparation of a strip-shaped insert of fiber grating sensors, co-extrusion molding of plastic and the strip-shaped insert of fiber grating sensors, welding of pipes containing the strip-shaped insert of fiber grating sensors and other important steps, thereby comprehensively and systematically guaranteeing the quality of a finished product of the intelligent plastic pipe, and facilitating the construction of urban pipelines and the construction of "smart cities".

In order to achieve the above objective, the present invention adopts the following technical solutions:

A strip-shaped insert of fiber grating sensors of an intelligent plastic pipe includes matrix resin, a temperature fiber grating sensor, a strain fiber grating sensor and reinforcing fibers, wherein the temperature fiber grating sensor and the strain fiber grating sensor are placed side by side in parallel, and both have multiple grating units, and the grating units are located at corresponding positions and jointly form a grating pair having both temperature and strain monitoring functions; and the temperature fiber grating sensor and the strain fiber grating sensor are buried in the matrix resin, and the matrix resin is filled with the reinforcing fibers in the longitudinal direction.

The reinforcing fibers are uniformly distributed side by side in the strip-shaped insert of fiber grating sensors for supporting the skeleton of the entire strip-shaped insert of fiber grating sensors.

Further, a plurality of grid regions can be engraved in each optical fiber of the temperature fiber grating sensor and the strain fiber grating sensor to form a fiber grating string for distributed multi-point detection, and the distance between the grid regions can be set as needed.

Preferably, the parallel distance between the adjacent temperature fiber grating sensor and the strain fiber grating sensor is 0.25-2 mm.

Preferably, the grid regions of the temperature fiber grating sensor are packaged by capillary steel tubes, and the two ends of the capillary steel tubes are sealed.

Preferably, the core diameters of the temperature fiber grating sensor and the strain fiber grating sensor are 5-50 µm.

Preferably, the strip-shaped insert of fiber grating sensors is a rectangular strip material with a thickness of 0.4-1.2 mm and a width of 1-10 mm to facilitate the implantation operation. Of course, those skilled in the art can replace the strip-shaped insert of fiber grating sensors with other shapes, such as a cylindrical shape or the like according to the working principle of the present invention, but the objective is to make the sensor insert flexible, easy to wind and convenient to implant. Therefore, such improvements belong to conventional replacements that are readily conceivable to those skilled in the art and should fall within the protection scope of the present invention.

The matrix resin material of the strip-shaped insert of fiber grating sensors is the same as the pipe material to be implanted, so as to improve the strength compatibility, the interface compatibility and the field distribution compatibility of the strip-shaped insert of fiber grating sensors and the pipe, minimize the effect of the strip-shaped insert of fiber grating sensors on the performance of the product, and meanwhile reduce the strain transfer loss of the sensors and improve the test accuracy.

Preferably, the melting point of the reinforcing fibers in the strip-shaped insert of fiber grating sensors is at least 60° C. higher than the melting point of the matrix resin, so as to ensure that the reinforcing fibers do not melt during the co-extrusion molding of the strip-shaped insert of sensors and the plastic pipe, and thus guaranteeing that the fiber grating in the strip-shaped insert of sensors generates no deflection or bend in the entire implantation process.

The types of commonly used reinforcing fibers are diversified, and polyester fibers, nylon fibers, and spandex are preferred. Of course, those skilled in the art can replace the reinforcing fibers with other materials based on the working principle of the present invention, but the objective is to make the sensor insert have both rigidity and flexibility, therefore, such improvements belong to conventional replacements that are readily conceivable to those skilled in the art and should fall within the protection scope of the present invention.

Preferably, the volume content of the reinforcing fibers in the strip-shaped insert of fiber grating sensors is 30-50%, so that the strip-shaped insert of sensors has both rigidity and flexibility. If the content of the reinforcing fibers is too low, the fiber grating sensor insert can be easily broken during pultrusion, and the molding and manufacturing of the insert become difficult; and on the contrary, the strip-shaped insert of fiber grating sensors is unlikely to bend due to the too large rigidity, such that the strip-shaped insert of sensors is difficult to attach to a die cavity wall surface after being obliquely guided into an extrusion die cavity.

The strip-shaped insert of fiber grating sensors needs to be marked with color in order to locate the sensor, and meanwhile remind the construction personnel to protect the strip-shaped insert of sensors from being damaged. It should be noted that the color of the strip-shaped insert of sensors cannot conflict with the color of a common marker on the pipe to ensure convenient distinguishing.

A fiber grating sensor insert implanting system includes a barrel body, wherein an accommodating cavity is arranged in the barrel body, a rotary propulsion component is sleeved in the accommodating cavity, the rotary propulsion component is connected with a drive motor, an extrusion head is arranged on one side of the barrel body, the accommodating cavity communicates with an extrusion die cavity in the extrusion head, and an extrusion opening die is arranged at a front end of the extrusion head; and the extrusion die cavity communicates with a conveying passage that is arranged on the extrusion head and obliquely extends outward, and a conveying element for conveying a strip-shaped insert of fiber grating sensors is arranged on the outer side of the conveying passage, so that the strip-shaped insert of fiber grating sensors is subjected to extrusion molding together with a plastic raw material in the extrusion die cavity. The drive motor provides power to drive the rotary propulsion component to rotate at a high speed and agitate the plastic raw material in the accommodating cavity so as to melt it, and the strip-shaped insert of fiber grating sensors is obliquely conveyed into the extrusion head by the conveying passage under the guidance of the conveying element, put close to the surface of the extrusion die cavity and passed through the extrusion opening die together with the molten plastic raw material, and an intelligent plastic pipe is obtained after cooling and shaping.

Further, a raw material inlet is formed in the barrel body, and the raw material inlet communicates with the accommodating cavity.

Preferably, the rotary propulsion component is a screw.

Preferably, the conveying element includes multiple pairs of rollers, the rollers are arranged successively in pairs at the front end of the conveying passage in pairs, and at least one pair of rollers are close to the extrusion head and are used for adjusting and locating the guiding direction and angle of the strip-shaped insert of sensors, and guiding the strip-shaped insert of sensors to run forward to the conveying passage.

The sectional dimension of the conveying passage is set according to the sectional dimension of the strip-shaped insert of fiber grating sensors, the width thereof is 1-2 mm greater than the width of the strip-shaped insert of sensors, and the height thereof is 0.5-1 mm greater than the thickness of the strip-shaped insert of sensors so as to ensure that the strip-shaped insert of sensors can smoothly pass through the conveying passage without twisting.

Preferably, an included angle between the conveying passage and the axial line of the extrusion head should be less than 60° to avoid the breakage of the strip-shaped insert of fiber grating sensors due to excessive bending when being attached to the die cavity wall surface after being obliquely guided into the extrusion die cavity.

Further, an embedding point of the strip-shaped insert of fiber grating sensors is located on the surface of the extrusion die cavity and passes through the extrusion opening die together with the molten plastic to form the plastic pipe with the implanted strip-shaped insert of fiber grating sensors. Such arrangement ensures that the strip-shaped insert of fiber grating sensors is implanted in the outer surface of the plastic pipe, which facilitates the detachment with the pipe main body during the subsequent welding operation, so that the welding of the plastic with the plastic and the welding of the optical fiber with the optical fiber can be realized separately.

The length of the plastic pipe with the implanted strip-shaped insert of fiber grating sensors can be cut according to needs, but the cutting position should avoid the grid region of the fiber grating sensor and keep a distance of at least 10 cm from the grid region.

A preparation method of an intelligent plastic pipe includes the following steps:

(1) preparing a strip-shaped insert of fiber grating sensors;

(2) obliquely conveying the obtained strip-shaped insert of fiber grating sensors into an extrusion head through a conveying passage, putting the strip-shaped insert of fiber grating sensors close to a die cavity surface and passing the same through an extrusion opening die together with molten plastic, performing cooling and shaping to obtain a plastic pipe with implanted fiber grating sensors, and then cutting and packaging according to needs; and (3) respectively welding the plastic pipe and the fiber grating sensors therein through a connecting flange with an implanted fiber grating insert to accomplish the cut-through of the pipe and the relay of an optical signal.

The step (1) specifically includes:

a) fixing reinforcing fibers and optical fibers subjected to grid engraving to a yarn frame, and causing the reinforcing fibers and the optical fibers to penetrate through a yarn guide plate, wherein the optical fiber is located at the middle position, and yarn bundles of reinforcing fibers are uniformly distributed on the surrounding of the optical fibers;

b) performing drying and liquid high-temperature resin impregnation on the optical fibers and reinforcing fibers that penetrate through the yarn guide plate;

c) causing the optical fibers and the reinforcing fibers subjected to liquid high-temperature resin impregnation to penetrate through a molding die through a pultrusion process, and extruding excessive resin and removing bubbles in the material during the molding to obtain the strip-shaped insert of fiber grating sensors with a certain sectional shape; and d) causing the obtained strip-shaped insert of fiber grating sensors to reach a winder at a constant speed under the dragging action of a tractor to perform winding and packaging treatments.

In the step (3), the fiber grating sensor insert is implanted in the connecting flange of the plastic pipe, and the optical fiber connectors are led out from two ends of the flange, and then the optical fibers in transmission optical fiber connectors on the two ends of the flange are respectively welded with the optical fibers implanted in the plastic pipe to accomplish the extension of the optical fibers and the relay of the optical signal. It should be noted that the number of the transmission optical fibers implanted in the connecting flange is the same as the number of the fiber grating sensors implanted in the plastic pipe, and the colors are in one-to-one correspondence to ensure that the same fiber grating sensor is welded with the flange successively.

Further, before the fiber grating is welded, a small segment of strip-shaped insert of sensors with a length of 4-10 cm needs to be stripped from the surface of the pipe. The stripped sensor insert is heated to melt to remove the packaging material on the outer layer of the optical fibers so as to expose the bare fibers for welding. Then, the excessive parts of the welded transmission optical fibers are arranged in the optical fiber connector hole of the connecting flange, and the optical fiber welding positions are gummed after the plastic pipe is welded to protect a transmission optical path of the fiber grating from being damaged.

Compared with the prior art, the present invention has the following beneficial effects:

(1) the present invention provides a strip-shaped insert of fiber grating sensors implanted in the plastic pipe, the sensor insert has both rigidity and flexibility and can be accurately and reliably embedded in the surface of the pipe during the continuous extrusion molding of the plastic pipe so as to avoid the damage to the sensor in bad working conditions, thus significantly improving the survival rate and the test accuracy of the sensor, and meanwhile facilitating the welding between plastic pipes and the welding between the fiber grating sensor and the transmission optical fiber;

(2) the present invention provides a fiber grating sensor implanting system of an intelligent plastic pipe, the system can conveniently implant strip-shaped insert of fiber grating sensors in the surface of the plastic pipe during producing the plastic pipe, thereby ensuring integrated molding and facilitating streamline production; and (3) the present invention provides a fiber grating sensor implanting method of an intelligent plastic pipe, the method is simple to operate, and the conventional continuous extrusion process technology of plastic pipes is combined with the optical fiber communication technology, the manufactured intelligent plastic pipe can achieve real-time online monitoring of temperature, strain, pressure and other parameters, and then can realize the safety early warning, fault diagnosis and automatic control of urban pipe networks, thereby effectively promoting the construction of "smart cities".

BRIEF DESCRIPTION OF THE DRAWINGS

The drawings constituting a part of the present application are used for providing a further understanding of the present application, and the exemplary embodiments of the present application and the descriptions thereof are used for explaining the present application and do not constitute improper limits to the present application.

Figures 1A, 1B:
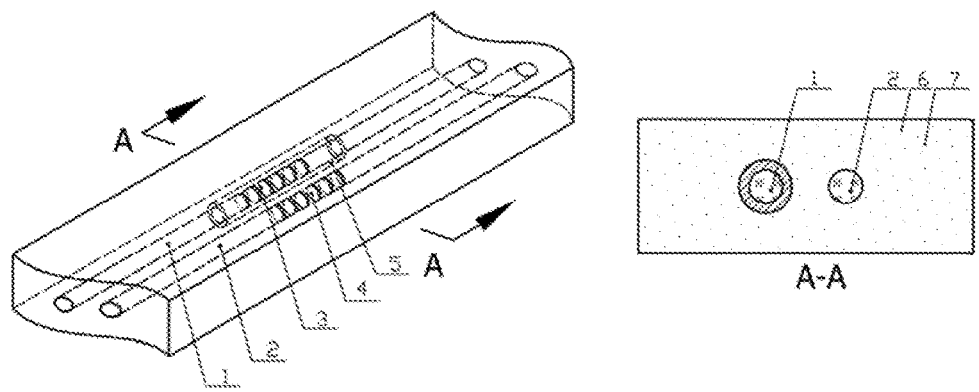
FIG. 1(a) is a structural schematic diagram of the strip-shaped insert of fiber grating sensors in the present invention.
FIG. 1(b) is a partial side view of FIG. 1(a) in the present invention.

REFERENCE SIGNS 1 represents a temperature fiber grating sensor; 2 represents a strain fiber grating sensor; 3 represents a temperature grating unit; 4 represents a strain grating unit; 5 represents a capillary steel tube; 6 represents a reinforcing fiber; 7 represents matrix resin; 8 represents an extruder drive motor; 9 represents a gear; 10 represents a plastic raw material; 11 represents a screw; 12 represents a barrel; 13 represents an extrusion head; 14 represents an extrusion die cavity; 15 represents an extrusion opening die; 16 represents a strip-shaped insert of fiber grating sensors; 17 represents a conveying roller; 18 represents a conveying passage; 19 represents an intelligent plastic pipe; and 20 represents a connecting flange.

DETAILED DESCRIPTION OF THE EMBODIMENTS

The present invention will be further described below with reference to the drawings and embodiments.

It should be noted that the following detailed descriptions are illustrative and are intended to provide further explanation of the present application. Unless defined otherwise, all technical and scientific terms used herein have the same meaning as commonly understood by those of ordinary skill in the art to which the present application belongs.

It should be noted that the terms used herein are merely used for describing the specific embodiments and are not intended to limit the exemplary embodiments according to the present application. As used herein, unless the context clearly indicates otherwise, the singular forms are intended to include the plural forms as well. In addition, it should also be understood that when the terms "including" and/or "comprising" are used in the specification, they indicate the existence of features, steps, operations, devices, components, and/or combinations thereof.

In the present invention, the orientation or positional relationships indicated by the terms such as "upper", "lower", "left", "right", "front", "back", "vertical", "horizontal", "side", "bottom" and the like are orientation or positional relationships shown in the drawings and are merely relative terms defined for the convenience of describing the relationship between various components or elements of the present invention, rather than particularly referring to any component or element in the present invention and cannot be interpreted as limits to the present invention.

In the present invention, the terms such as "fixedly connected", "connected", "connection" and the like should be understood in a broad sense and may indicate a fixed connection, and may also be an integral connection or a detachable connection; and can be directly connected and may also be connected through a media. Related scientific research or technical personnel in the art can determine the specific meanings of the above terms in the present invention according to specific circumstances, and it should not be construed as a limitation to the present invention. As described in the background art, it is very difficult to implant the fiber grating sensors in an industrial continuous extrusion process of the pipes, and the implantation of the fiber grating sensors in the industrial continuous extrusion process of the pipes is still a technical bottleneck of intelligent plastic pipes. In order to solve the above technical problems, the present invention provides a fiber grating sensor implanting system and method of an intelligent plastic pipe. In the present invention, a strip-shaped insert of fiber grating sensors is accurately implanted in an oblique guiding manner in the outer surface of the pipe during the continuous extrusion molding process of the plastic pipe, so that temperature and strain sensors implanted beforehand in the strip-shaped insert are buried in the pipe, the survival of the sensors in a bad pipe manufacturing and working environment is ensured, and real-time online monitoring on parameters of the pipe such as temperature, strain, pressure and the like is achieved.

A fiber grating sensor implanting method of an intelligent plastic pipe specifically includes a preparation step of a strip-shaped insert of fiber grating sensors, a co-extrusion molding pipe step of plastic and the strip-shaped insert of fiber grating sensors, a welding step of the pipes containing the strip-shaped insert of fiber grating sensors.

First step: the preparation step of the strip-shaped insert of fiber grating sensors includes.

Fixing the reinforcing fibers and the optical fibers subjected to grid engraving to a yarn frame, and causing the reinforcing fibers and the optical fibers to penetrate through a yarn guide plate, wherein the optical fibers are located at the middle position, and reinforcing fiber yarn bundles are uniformly distributed on the surrounding of the optical fibers; performing drying and liquid high-temperature resin impregnation on the two materials; causing the optical fibers and the reinforcing fibers subjected to liquid high-temperature resin impregnation to penetrate through a molding die through a pultrusion process, and extruding excessive resin and removing bubbles in the materials during the molding to obtain the strip-shaped insert of fiber grating sensors with a certain sectional shape; and causing the obtained strip-shaped insert of fiber grating sensors to reach a winder at a constant speed under the dragging action of a tractor to perform winding and packaging treatments.

The prepared strip-shaped insert of fiber grating sensors is a rectangular strip material with a thickness of 0.4-1.2 mm and a width of 1-10 mm, and includes at least a temperature fiber grating sensor and a strain fiber grating sensor. The temperature fiber grating sensor measures temperature, the strain fiber grating sensor detects strain, and all fiber grating sensors in the same inert are respectively marked with different colors for the convenience of distinguishing.

Further, the temperature fiber grating sensor and the strain fiber grating sensor are placed side by side in parallel, and grating units are located at corresponding positions and jointly form a grating pair having both temperature and strain monitoring functions. In addition, a plurality of grid regions can be engraved in each optical fiber to form a fiber grating string for distributed multi-point detection, and the distance between the grid regions can be set as needed.

Preferably, the parallel distance between the adjacent fiber grating sensors is 0.25-2 mm.

Preferably, the grid regions of the temperature fiber grating sensor are packaged by capillary steel tubes with outside diameters of 0.7 mm, and the two ends of the capillary steel tubes are sealed by DG-4 double-component glue.

Preferably, the core diameter of the fiber grating sensor is 5-50 μm.

The matrix resin material of the strip-shaped insert of fiber grating sensors is the same as the pipe material to be implanted, so as to improve the strength compatibility, the interface compatibility and the field distribution compatibility of the strip-shaped insert of fiber grating sensors and the pipe, minimizing the effect of the strip-shaped insert of fiber grating sensors on the performance of the pipe, and meanwhile reduce the strain transfer loss of the sensors and improve the test accuracy.

Preferably, the melting point of the reinforcing fibers in the strip-shaped insert of fiber grating sensors is at least 60° C. higher than the melting point of the matrix resin, so as to ensure that the reinforcing fibers do not melt during the co-extrusion molding of the strip-shaped insert of sensors and the plastic pipe, and thus guaranteeing that the fiber grating in the strip-shaped insert of sensors generates no deflection or bend in the entire implantation process. The types of commonly used reinforcing fibers are diversified, and polyester fibers, nylon fibers, and spandex are preferred.

Preferably, the volume content of the reinforcing fibers in the strip-shaped insert of fiber grating sensors is 30-50%, so that the strip-shaped insert of sensors has both rigidity and flexibility. If the content of the reinforcing fibers is too low, the fiber grating sensor insert can be easily broken during pultrusion, and the molding as well as the manufacturing of the insert will become difficult; and on the contrary, the strip-shaped insert of fiber grating sensors is unlikely to bend due to the too large rigidity, such that the strip-shaped insert of fiber grating sensors is difficult to attach to a die cavity wall surface after being obliquely guided into an extrusion die cavity.

The strip-shaped insert of fiber grating sensors needs to be marked with a specific color in order to locate the sensor, and meanwhile remind the construction personnel to protect the strip-shaped insert of sensors from being damaged. It should be noted that the color of the strip-shaped insert of sensors cannot conflict with the color of a common marker on the pipe to ensure convenient distinguishing.

Second step, the co-extrusion molding pipe step of plastic and the strip-shaped insert of fiber grating sensors includes:

The obtained strip-shaped insert of fiber grating sensors is obliquely conveyed into an extrusion head through a conveying passage by the clamping, guiding and pushing of multiple pairs of rollers after being uncoiled, put close to a die cavity surface and passed through an extrusion opening die together with molten plastic, and then a plastic pipe with an implanted strip-shaped insert of fiber grating sensors is obtained after cooling and shaping, and cutting and packaging treatments are performed according to needs.

The clamping, guiding and pushing devices of the strip-shaped insert of sensors are mainly composed of multiple pairs of rollers and a specific conveying passage, and the first pair of rollers is located at positions further away from the extrusion head for pushing the strip-shaped insert of sensors to move forward; at least one pair of rollers are close to the extrusion head and are used for adjusting and locating the guiding direction and angle of the strip-shaped insert of sensors; and the conveying passage is a path for the strip-shaped insert of fiber grating sensors to arrive at the surface of the extrusion die cavity and is used for determining an initial embedding position of the strip-shaped insert of sensors in the plastic melt. It should be noted that, during the extrusion molding, the embedding point of the strip-shaped insert of fiber grating sensors is located on the surface of the extrusion die cavity and passes through the extrusion opening die together with the molten plastic to form the plastic pipe with the implanted strip-shaped insert of fiber grating sensors. At this time, the strip-shaped insert of fiber grating sensors is implanted in the outer surface of the plastic pipe to be conveniently stripped from the pipe main body during the subsequent welding operation, so that the welding of the plastic with the plastic and the welding of the optical fiber with the optical fiber can be realized separately.

The length of the plastic pipe with the implanted strip-shaped insert of fiber grating sensors can be cut according to needs, but the cutting position should avoid the grid region of the fiber grating sensor and keep a distance of at least 10 cm from the grid region.

Third step, the welding step of the pipe containing the strip-shaped insert of fiber grating sensors includes:

When the prepared plastic pipe with the implanted strip-shaped insert of fiber grating sensors is used, the cut-through of the pipe and the relay of the optical signal are accomplished through the respective welding between the plastic pipe and the fiber grating sensors therein through the connecting flange (with the implanted fiber grating insert).

The fiber grating sensor insert is implanted in the connecting flange of the plastic pipe, optical fiber connectors are led out from two ends of the flange, and the optical fibers in transmission optical fiber connectors on the two ends of the flange are respectively welded with the optical fibers implanted in the plastic pipe to accomplish the extension of the optical fibers and the relay of the optical signal. It should be noted that the number of the transmission optical fibers implanted in the connecting flange is the same as the number of the fiber grating sensors implanted in the plastic pipe, and the colors are in one-to-one correspondence to ensure that the same fiber grating sensor is welded with the flange successively.

Further, before the fiber grating is welded, a small segment of strip-shaped insert of sensors with a length of 4-10 cm needs to be stripped from the surface of the pipe. The stripped sensor insert is heated to melt to remove the packaging material on the outer layer of the optical fibers so as to expose the bare fibers for welding. Then, the excessive parts of the welded transmission optical fibers are arranged in an optical fiber connector hole of the connecting flange, and the optical fiber welding positions are gummed after the plastic pipe is welded to protect a transmission optical path of the fiber grating from being damaged.

The technical solutions will be described in more detail through several following exemplary embodiments:

Embodiment 1

A strip-shaped insert of fiber grating sensors for online monitoring of an intelligent plastic pipe, the structure is as shown in FIG. 1(a) and FIG. 1(b), includes: a temperature fiber grating sensor 1, a strain fiber grating sensor 2, reinforcing fibers 6 (in the present embodiment, the reinforcing fibers adopt polyester fibers) and matrix resin 7 (in the present embodiment, the matrix resin selects random copolymer polypropylene).

Figure 2:
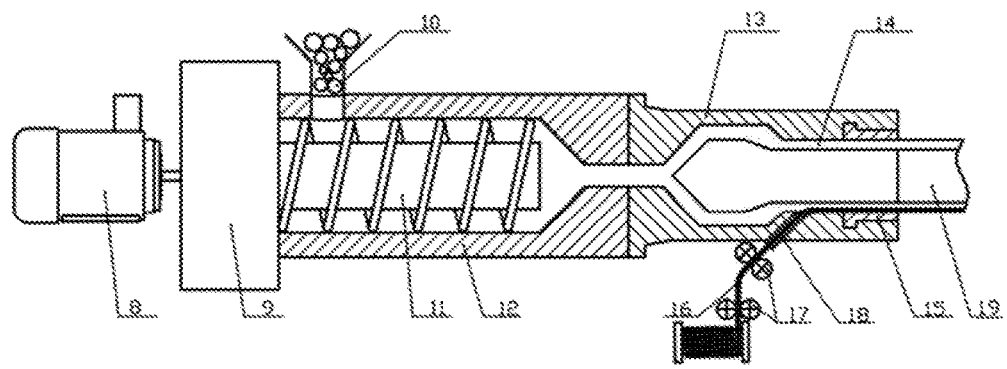
FIG. 2 is a schematic diagram of the manufacturing process of the plastic pipe with an implanted strip-shaped insert of fiber grating sensors.

The manufacturing process of the plastic pipe with the implanted strip-shaped insert of fiber grating sensors is as shown in FIG. 2, wherein an extruder drive motor 8 provides power, and a gear 9 drives a screw 11 to rotate at a high speed and agitate a plastic raw material 10 (in the present embodiment, the plastic raw material adopts random copolymer polypropylene) so as to melt it, then, the strip-shaped insert of fiber grating sensors 16 is obliquely conveyed into an extrusion head 13 by a conveying passage 18 under the clamping, conveying and guiding of a conveying roller 17, put close to the surface of an extrusion die cavity 14 and passed through an extrusion opening die 15 together with the molten random copolymer polypropylene 10, and the intelligent plastic pipe 19 is obtained after cooling and shaping.

Figure 3:
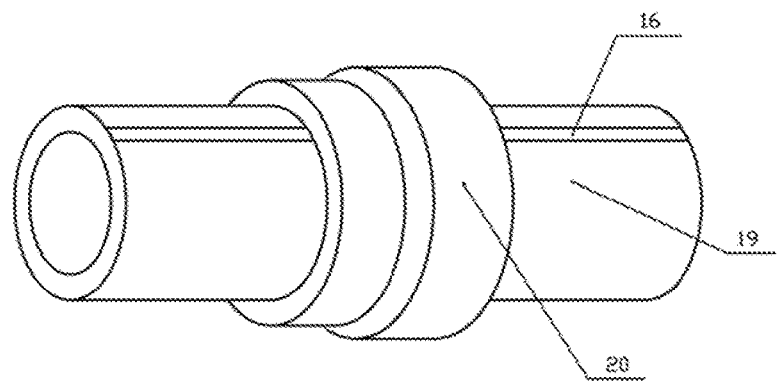
FIG. 3 is an overall structural schematic diagram of a welded intelligent plastic pipe.

FIG. 3 is an overall structural schematic diagram of a welded intelligent plastic pipe, and the intelligent plastic pipe 19 is respectively welded with the fiber grating sensors therein through a connecting flange 20 to accomplish the cut-through of the pipe and the relay of the optical signal.

A fiber grating sensor implanting method of an intelligent plastic pipe includes the following steps:

(1) preparing a strip-shaped insert of fiber grating sensors a) Selecting two optical fibers doped with photosensitive materials, and forming a thermoplastic protective layer of a certain thickness and different colors on the outer circumference of the optical fiber through a molding process such as hot extrusion, coating, and winding.

b) Stripping 10 mm optical fiber protection layer from the prepared optical fiber every 3 m to form a plurality of naked region of the optical fiber, and engraving gratings with different center wavelengths in each naked region of the optical fiber to form a plurality of fiber grating sensor units.

c) Selecting an engraved optical fiber in the step b), packaging all the grid regions engraved thereon in a capillary steel tube 5 respectively, ensuring that the grid regions are in a free status in the pipe, wherein the outside diameter of the capillary steel tube 5 is 0.7 mm, the wall thickness is 0.2 mm, and both ends are sealed by DG-4 double-component glue, then, placing it at room temperature for 24 hours to fully cure the DG-4 double-component glue so as to form a temperature fiber grating sensor 1; and the capillary steel tube 5 is not sleeved on the grid region of the other optical fiber to serve as a strain fiber grating sensor 2.

d) Fixing the temperature fiber grating sensor 1, the strain fiber grating sensor 2 and reinforcing fibers 6 to a yarn frame, and causing the same to penetrate through a yarn guide plate, wherein the temperature fiber grating sensor 1 and the strain fiber grating sensor 2 are located at the middle position, and the reinforcing fibers 6 are uniformly distributed on the surrounding of the fiber grating sensors, and the tension is adjusted to prevent the fibers from dropping and twisting.

e) Performing a dehumidification treatment on the two materials through a drying device, and impregnating the two materials in liquid high-temperature random copolymer polypropylene 7 in a glue tank.

f) Causing the temperature fiber grating sensor 1, the strain fiber grating sensor 2 and the reinforcing fibers 6 with the impregnated random copolymer polypropylene 7 to penetrate through a molding die through a pultrusion process to obtain the strip-shaped insert of fiber grating sensors 16 with a thickness of 1 mm and a width of 1.5 mm.

g) Causing the strip-shaped insert of fiber grating sensors 16 to reach a winder at a constant speed under the dragging action of a tractor to perform winding and packaging treatments.

(2) Preparation of the plastic pipe with the implanted strip-shaped insert of fiber grating sensors a) The extruder drive motor 8 is opened, and the gear 9 drives the screw 11 to rotate.

b) Granular random copolymer polypropylene 10 is into a barrel 12 of an extruder, and a heater is arranged at the outside of the barrel 12 of the extruder, and heat generated by the heater is transferred to the random copolymer polypropylene 10 in the barrel 12 to gradually raise the temperature.

c) With the rotation of the screw 11, the random copolymer polypropylene 10 is continuously conveyed forward and generates collision and friction with the screw 11 and the barrel 12 in the conveying process to generate a large amount of heat, which continuously melts the random copolymer polypropylene 10 under the coactions with heat conduction, and the molten random copolymer polypropylene 10 is continuously and stably conveyed into an extrusion head 13.

d) The strip-shaped insert of fiber grating sensors 16 prepared in the step (1) is uncoiled, the uncoiled strip-shaped insert of fiber grating sensors 16 is conveyed by the conveying passage 18 into the extrusion head 13 through the clamping, guiding and pushing of the conveying roller, put close to the surface of the die cavity 14 and passed through the extrusion opening die 15 together with molten random copolymer polypropylene 10, and then, the intelligent plastic pipe 19 is obtained after cooling and shaping.

e) Under the action of a traction device, the intelligent plastic pipe 19 advances continuously and is cut and packaged after arriving at a cutting device for the convenience of storage and transport.

(3) Welding of the intelligent plastic pipe a) Firstly, a small segment of the strip-shaped insert of fiber grating sensors 16 with a length of 5 cm is stripped from the surface of the intelligent plastic pipe 19, and the stripped sensor insert is heated to melt to remove the packaging material on the outer layer of the optical fibers so as to expose the bare fibers.

b) Optical fiber connectors are led out from two ends of the connecting flange 20, and the colors of the transmission optical fibers in the optical fiber connectors are in one-to-one correspondence with those of the temperature fiber grating sensor 1 and the strain fiber grating sensor 2 in the strip-shaped insert of fiber grating sensors 16, the optical fibers in the corresponding transmission optical fiber connectors are welded with the optical fibers implanted in the plastic pipe using an optical fiber welding machine, and the excessive parts of the welded transmission optical fibers are respectively arranged in optical fiber connector hole of the connecting flange 20, and the optical fiber welding positions are gummed.

c) The pipe orifice position of the intelligent plastic pipe 19 is heated and is embedded in the connecting flange 20 and is welded with the intelligent plastic pipe embedded in the other end to accomplish the cut-through of the pipe, the extension of the optical fibers and the relay of the optical signal.

d) After complete cut-through of the pipe, the transmission optical fibers are lead out from the pipe to be welded with an external transmission optical cable, and an optical cable connector is connected with a fiber grating demodulation system to achieve online monitoring of the temperature and the strain of the plastic pipe.

Embodiment 2

The difference with the embodiment 1 lies in that, nylon fibers are used as the reinforcing fibers in the strip-shaped insert of fiber grating sensors, and polyvinyl chloride is used as the matrix resin and the pipe raw material in the strip-shaped insert of fiber grating sensors.

Embodiment 3

The difference with the embodiment 1 lies in that, spandex used as the reinforcing fibers in the strip-shaped insert of fiber grating sensors, and polyethylene is used as the matrix resin and the pipe raw material in the strip-shaped insert of fiber grating sensors.

The foregoing descriptions are merely preferred embodiments of the present application and are not intended to limit the present application. For those skilled in the art, the present application may have various changes and variations. Any modifications, equivalent substitutions, improvements and the like within the spirit and principle of the present application shall be included in the protection scope of the present application.

Although specific embodiments of the present invention have been described above with reference to the drawings, the protection scope of the present invention is not limited thereto. Those skilled in the art should understand that, based on the technical solutions of the present invention, various modifications or variations that can be made by those skilled in the art without any creative effect are still within the protection scope of the present invention.

The invention claimed is:

1. A system for implanting a strip-shaped insert of fiber grating sensors, the system comprising:
   a barrel body with an accommodating cavity arranged therein;
   a rotary propulsion component sleeved in the accommodating cavity;
   a drive motor connected to the rotary propulsion component;
   an extrusion head arranged on one side of the barrel body and having an extrusion die cavity formed therein that communicates with the accommodating cavity, the extrusion die cavity also communicating with a conveying passage that is arranged on the extrusion head and obliquely extends outward; and
   a conveying element that is for conveying the strip-shaped insert of fiber grating sensors and that is arranged on an outer side of the conveying passage so that the strip-shaped insert of fiber grating sensors is subjected to extrusion molding together with a plastic raw material in the extrusion die cavity, wherein
   the strip-shaped insert of fiber grating sensors comprises (a) a temperature fiber grating sensor, (b) a strain fiber grating sensor, (c) reinforcing fibers, and (d) matrix resin; and
   an extrusion opening die is arranged at a front end of the extrusion head.

2. The system for implanting a strip-shaped insert of fiber grating sensors according to claim 1, wherein a raw material inlet is formed in the barrel body, and the raw material inlet communicates with the accommodating cavity.

3. The system for implanting a strip-shaped insert of fiber grating sensors according to claim 1, wherein the conveying element comprises multiple pairs of rollers arranged successively at a front end of the conveying passage, and at least one pair of rollers are close to the extrusion head and are used for adjusting and locating the guiding direction and angle of the strip-shaped insert of fiber grating sensors and guiding the strip-shaped insert of fiber grating sensors to run forward to the conveying passage.

4. The system for implanting a strip-shaped insert of fiber grating sensors according to claim 1, wherein an embedding point of the strip-shaped insert of fiber grating sensors is located on a surface of the extrusion die cavity, and the strip-shaped insert of fiber grating sensors passes through the extrusion opening die together with molten plastic to form a plastic pipe with the implanted strip-shaped insert of fiber grating sensors.

5. A preparation method of an intelligent plastic pipe, comprising the following steps:
 (1) preparing a strip-shaped insert of fiber grating sensors, the strip-shaped insert of fiber grating sensors comprising (a) a temperature fiber grating sensor, (b) a strain fiber grating sensor, (c) reinforcing fibers, and (d) matrix resin;
 (2) obliquely conveying the prepared strip-shaped insert of fiber grating sensors into an extrusion head through a conveying passage, putting the strip-shaped insert of fiber grating sensors close to a die cavity surface and passing the strip-shaped insert of fiber grating sensors through an extrusion opening die together with molten plastic;
 (3) then performing cooling and shaping to obtain a plastic pipe with the strip-shaped insert of fiber grating sensors implanted therein;
 (4) performing cutting and packaging according to needs; and
 (5) respectively welding the plastic pipe and the fiber grating sensors therein through a connecting flange that has an implanted fiber grating sensor insert to accomplish cut-through of the pipe and relay of an optical signal.

6. The preparation method of an intelligent plastic pipe according to claim 5, wherein the step (1) specifically comprises:
 a) fixing to a yarn frame (i) the reinforcing fibers, (ii) the temperature fiber grating sensor, and (iii) the strain fiber grating sensor, the fiber grating sensors being subjected to grid engraving, and causing each of the reinforcing fibers and the fiber grating sensors to penetrate through a yarn guide plate, wherein the temperature fiber grating sensor and the strain fiber grating sensor are located at a middle position, and the reinforcing fibers are uniformly distributed around the temperature fiber grating sensor and the strain fiber grating sensor;
 b) performing drying and liquid high-temperature resin impregnation on the temperature fiber grating sensor, the strain fiber grating sensor, and the reinforcing fibers that penetrate through the yarn guide plate;
 c) causing the temperature fiber grating sensor, the strain fiber grating sensor, and the reinforcing fibers, after being subjected to the liquid high-temperature resin impregnation, to penetrate through a molding die through a pultrusion process, and extruding excessive resin and removing bubbles during the pultrusion process to obtain the strip-shaped insert of fiber grating sensors with a certain sectional shape; and
 d) causing the obtained strip-shaped insert of fiber grating sensors to reach a winder at a constant speed under dragging action of a tractor to perform winding and packaging treatments.

7. The preparation method of an intelligent plastic pipe according to claim 5, wherein the fiber grating sensor insert is implanted in the connecting flange of the plastic pipe, optical fiber connectors are led out from two ends of the flange, and then optical fibers in the optical fiber connectors on the two ends of the flange are respectively welded with optical fibers in the strip-shaped insert of fiber grating sensors implanted in the plastic pipe to accomplish extension of the fiber grating sensors and the relay of the optical signal.

8. The preparation method of an intelligent plastic pipe according to claim 5, wherein before the fiber grating sensors are welded, a small segment of the strip-shaped insert of fiber grating sensors is stripped from a surface of the plastic pipe, and the stripped small segment of the strip-shaped insert of fiber grating sensors is heated to melt and remove packaging material on an outer layer of the fiber grating sensors so as to expose bare fibers for the convenience of welding, then excessive parts of the welded fiber grating sensors are arranged in an optical fiber connector hole of the connecting flange, and welding positions are gummed after the plastic pipe is welded to protect a transmission optical path of the fiber grating sensors from being damaged.

* * * * *